(No Model.) 2 Sheets—Sheet 2.

G. W. BISBEE.
DRYING AND COOLING APPARATUS FOR GRAIN, &c.

No. 515,513. Patented Feb. 27, 1894.

Witnesses:
Fred Gerlach
J. B. Carpenter

Inventor:
Geo. W. Bisbee
By Price & Fisher
Attorneys.

UNITED STATES PATENT OFFICE.

GEORGE WALTER BISBEE, OF CHICAGO, ILLINOIS, ASSIGNOR OF ONE-HALF TO MERRICK F. PROUTY, OF SAME PLACE.

DRYING AND COOLING APPARATUS FOR GRAIN, &c.

SPECIFICATION forming part of Letters Patent No. 515,513, dated February 27, 1894.

Application filed November 30, 1891. Renewed January 22, 1894. Serial No. 497,720. (No model.)

*To all whom it may concern:*

Be it known that I, GEORGE WALTER BISBEE, of Chicago, in the county of Cook and State of Illinois, have invented certain new and useful Improvements in Drying and Cooling Apparatus for Grain and other Materials, of which I do declare the following to be a full, clear, and exact description, reference being had to the accompanying drawings, forming part of this specification.

My present invention has for its object to provide improved apparatus whereby the drying and cooling of the grain or the drying of such material as "brewers' grain," distillers' slop or the like can be readily and effectively accomplished. This object of invention I have attained by the novel features of construction hereinafter described, illustrated in the accompanying drawings, and particularly pointed out in the claims at the end of this specification.

Figure 1:
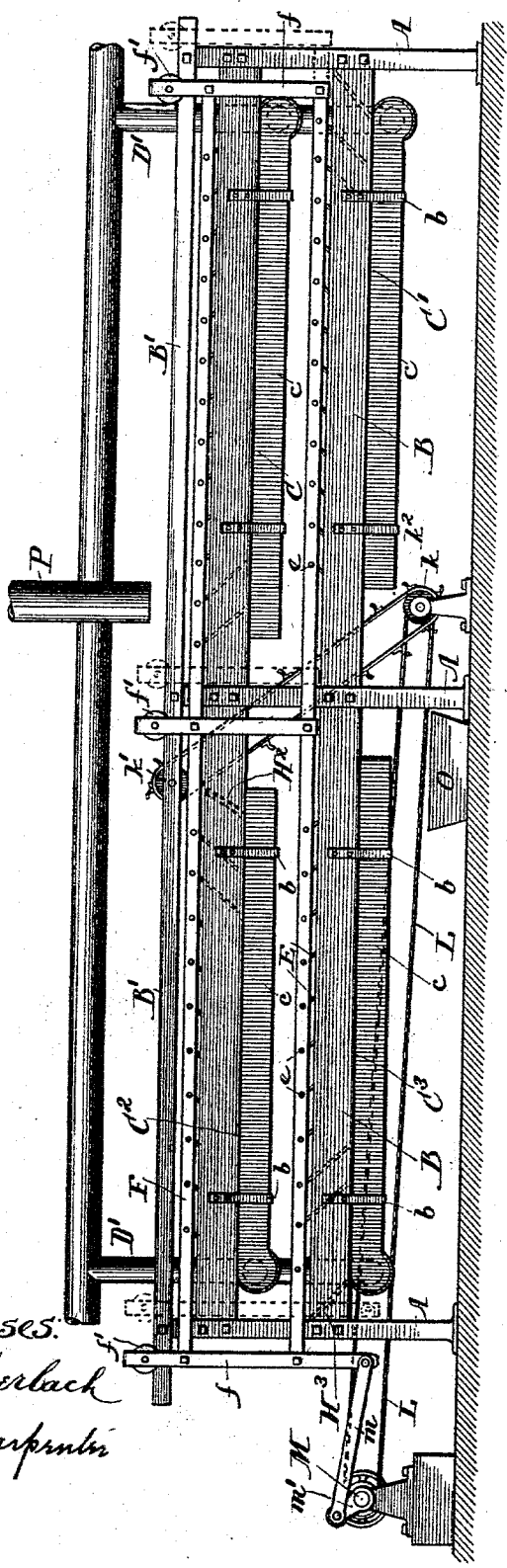
Figure 2:
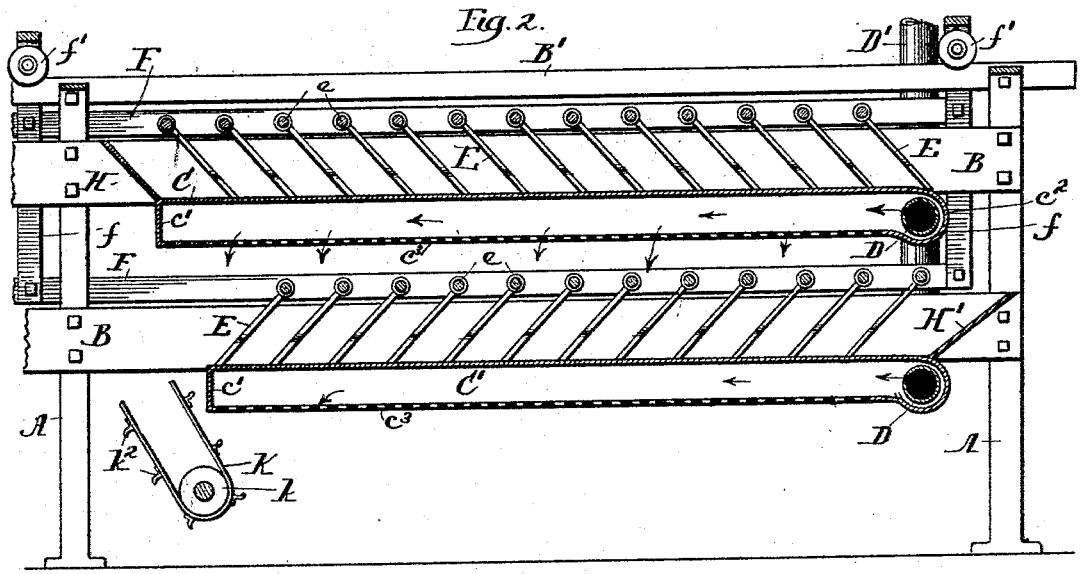
Figure 3:
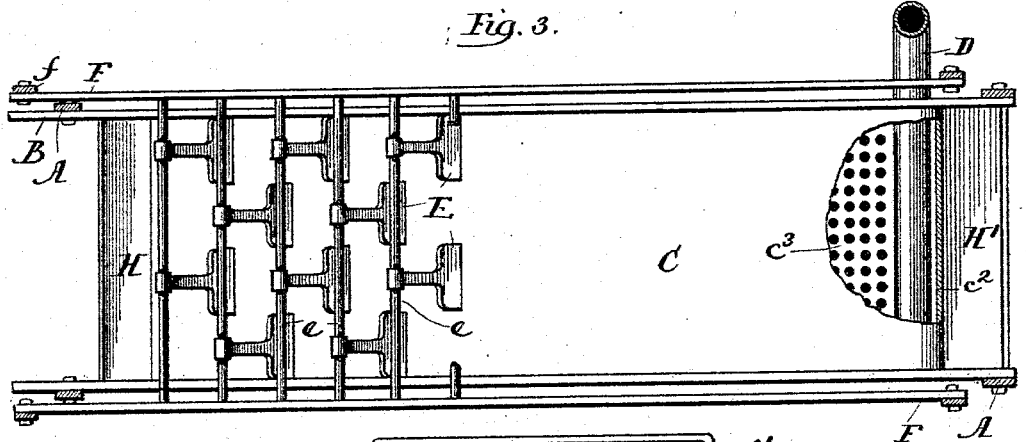
Figure 4:
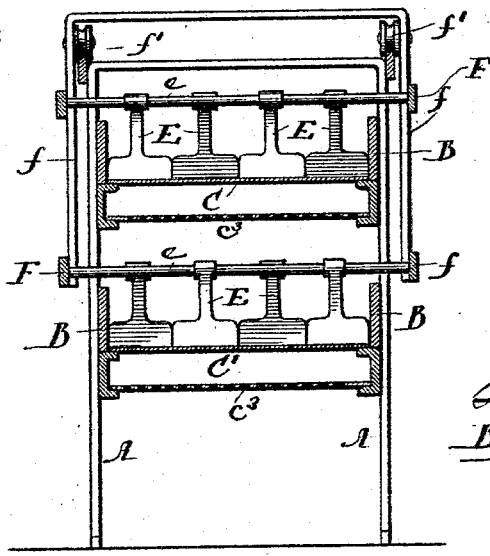

Figure 1 is a view in side elevation of an apparatus embodying my invention. Fig. 2 is a view in vertical longitudinal section through one section of the apparatus illustrated in Fig. 1. Fig. 3 is a plan view of a portion of the apparatus illustrated in Fig. 2, parts being removed, and parts broken away for the purpose of better illustration. Fig. 4 is a view in vertical section taken centrally through Fig. 2.

The main sustaining frame of my improved apparatus may be of any convenient construction, but I have shown it as consisting of vertical bars or standards A to which are bolted the side bars B and top bars or rails B'.

Between the side bars B extend the trays or tables C, C', $C^2$ and $C^3$, these tables being in suitable number and preferably arranged in banks or series of two or more so that the grain as it is discharged from one table or tray may be delivered on to the next succeeding table or tray of the same series, and may thereafter be conveyed to be delivered in like manner to the next series of trays or tables. The trays or tables C, &c., may be conveniently attached to the side bars B of the main frame by straps $b$, and these trays or tables are formed with sides $c$ and ends $c'$ and $c^2$ and with perforated or foraminous bottoms $c^3$.

To each of the trays or tables is suitably connected an air-delivery pipe D leading to a trunk pipe D' by which the supply of hot or cold air will be delivered to the compartments formed at the under sides of the trays or tables, it being understood that the air-supply pipe D' will receive a blast of hot or cold air from any suitable source.

Above each of the trays or tables C, C', $C^2$ and $C^3$ is mounted a series of blades or shovels E, that are pivotally sustained by means of the rods $e$ that are carried by the side bars F of the shifting frame. The side bars of the shifting frame are united together by means of vertical bars $f$, the upper ends of these bars being furnished with friction rollers $f'$ that travel upon the upper edges of the bars or rails B' of the main frame. Preferably the vertical bars $f$ of the shifting frame extend across the top of the machine so as to give rigidity to the shifting frame, and better insure the unison movement of its side bars and the blades or shovels carried thereby. By preference the blades or shovels E are arranged in alternating series as shown more particularly in Figs. 3 and 4, that is to say, the blades or shovels upon one rod alternate in position with the blades or shovels upon the next adjacent rod, and the blades or shovels E are arranged in such manner that when the shifting frame is operated in one direction, they will serve to advance the grain or other material, and when the shifting frame is moved in opposite direction they will ride freely over the body of grain.

The tray or table C is preferably provided at one end with an inclined delivery plate H to insure the proper delivery of the material to be dried or cooled onto the top of the tray or table, as it is fed thereto through a suitable pipe P, and in like manner the tray or table C' is provided at the opposite end with a delivery plate H' to insure the delivery onto this tray or table, of the grain or other material as it passes from off the end of the superposed tray or table C.

Adjacent the discharge end of the tray or table C' extends a conveyer belt K that is carried by suitable pulleys $k$ and $k'$, the pulley $k$ being driven by a sprocket chain L from the main drive shaft M. This conveyer belt is furnished with suitable slats or buckets $k^2$ and extends from beneath the tray C' up to and over the tray C² of the second series, thereby serving to elevate the grain or other material as it passes from the tray C' and deliver it onto the upper surface of the tray or table C². The tray or table C² is furnished with an inclined delivery plate H² at one end, and adjacent the conveyer belt K to insure the proper delivery of the material onto the tray, and the tray or table C³ is furnished with a delivery plate H³ extending beneath the discharge plate of the tray C², and serving to direct the material as it passes from the superposed tray C² onto the tray or table C³.

The shifting frame whereby the blades or shovels are moved, is reciprocated in any convenient manner, as for example, by a link $m$ connected to the shifting frame, and connected also to the crank arm $m'$ of the main drive shaft M.

From the foregoing description it will be seen that when the grain or other material to be dried has been delivered onto the tray or table C and reciprocating movement has been imparted to the shifting frame from the main drive shaft M, the shovels or blades E will serve to advance the grain slowly over the face of the tray or table C until it passes from the discharge end of this tray or table to the subjacent tray or table C' beneath it. By arranging the blades or shovels E in alternating manner, as shown, not only will the grain or other material be advanced gradually from end to end of the tray or table C, but it will also be turned over or agitated so as to thoroughly expose it to the heated surface of the tray or table. In like manner the grain or other material passing onto the tray or table C' will be advanced from end to end of this tray or table by its shovels E, and as it passes over this tray or table, it will be exposed not merely to contact with its heated surface, but it will be exposed also to the blast of hot air that is forced downward through the perforated bottom plate of the superposed tray or table C. Hence it will be seen that as the grain is stirred and moved forward by the blades or shovels E over the second table C, a much more effective absorption of its moisture will occur than would be possible if it were subjected only to the action of the heated tray or table C'. As the grain or other material is discharged from the tray or table C' it is carried upward by the conveyer belt K and delivered onto the tray or table C² of the second series over the surface of which it is fed by the blades or shovels E, being in measure dried by contact with the surface of this tray or table C', and from which it is discharged onto the subjacent tray or table C³. In its passage over the tray or table C³ which is effected by means of the blades or shovels traveling above this table, the grain is exposed not only to the heated surface of this tray or table, but is exposed also to the blast of hot air passing downward through the perforated bottom of the superposed tray or table C², and from this tray or table, it will be discharged into a suitable receptacle O, from which it may be carried off in any convenient manner.

It is manifest that any desired number of trays or tables may be employed, their arrangement being in superposed series as shown. It will be understood also that the lowermost trays or tables C' and C³, while shown as formed with perforated bottoms, could be formed simply with suitable discharge openings for the hot air at their ends or other convenient points, since it is not necessary that the lowermost trays or tables should be formed with foraminous bottoms.

While I have described my apparatus as used for drying grain or other material, it is manifest that it can be employed for cooling purposes, it being simply necessary in such case that cold air should be forced from the pipes instead of hot air.

By connecting the blades or shovels of the various trays or tables to a single shifting frame, a uniform movement of the grain over the various trays or tables is effected.

Having thus described my invention, what I claim as new, and desire to secure by Letters Patent, is—

1. An apparatus of the class described comprising a series of superposed trays or tables having air delivery pipes connected thereto, the upper one of said trays or tables being provided with downwardly extended sides and with a perforated bottom forming a compartment into which the air will be delivered, and blades or shovels for advancing the material over the surfaces of such trays or tables, substantially as described.

2. An apparatus of the class described comprising a series of superposed trays or tables having imperforate top plates and closed sides and ends, and perforated bottom plates, suitable air pipes within said trays or tables for delivering air between the top and bottom plates thereof, and a series of blades or shovels for advancing material over the surfaces of said trays or tables, substantially as described.

GEORGE WALTER BISBEE.

Witnesses:
 GEO. P. FISHER, Jr.,
 FRED GERLACH.